United States Patent
Inagaki et al.

(10) Patent No.: US 9,796,236 B2
(45) Date of Patent: Oct. 24, 2017

(54) HYDRAULIC SHOCK ABSORBER

(71) Applicant: KYB Corporation, Tokyo (JP)

(72) Inventors: Yasuhiro Inagaki, Aichi (JP); Shinichi Hagidaira, Gifu (JP); Ryousuke Kamakura, Aichi (JP)

(73) Assignee: KYB Corporation, Tokyo (JP)

( * ) Notice: Subject to any disclaimer, the term of this patent is extended or adjusted under 35 U.S.C. 154(b) by 0 days.

(21) Appl. No.: 15/025,611

(22) PCT Filed: Oct. 3, 2014

(86) PCT No.: PCT/JP2014/076524
§ 371 (c)(1),
(2) Date: Mar. 29, 2016

(87) PCT Pub. No.: WO2015/050241
PCT Pub. Date: Apr. 9, 2015

(65) Prior Publication Data
US 2016/0236533 A1    Aug. 18, 2016

(30) Foreign Application Priority Data

Oct. 3, 2013   (JP) ................................. 2013-207870

(51) Int. Cl.
*B60G 17/08* (2006.01)
*F16F 9/348* (2006.01)
(Continued)

(52) U.S. Cl.
CPC ............. *B60G 17/08* (2013.01); *F16F 9/348* (2013.01); *F16F 9/46* (2013.01); *B60G 13/08* (2013.01); *F16F 9/06* (2013.01); *F16F 9/19* (2013.01)

(58) Field of Classification Search
CPC ........ F16F 9/348; F16F 9/3485; F16F 9/3488; F16F 9/465; F16F 9/48; F16F 9/516; F16F 9/46
(Continued)

(56) References Cited

U.S. PATENT DOCUMENTS 5,152,379 A  * 10/1992 Sackett ............. B60G 17/0152
                                                        188/266.5
8,544,619 B2 * 10/2013 Yamaguchi ........... F16F 9/3485
                                                        188/282.1
(Continued)

FOREIGN PATENT DOCUMENTS

DE        102007005288 B4 *  9/2013  ............. F16F 9/465
JP        08-004818 A         1/1996
(Continued)

*Primary Examiner* — Thomas J Williams
(74) *Attorney, Agent, or Firm* — Rabin & Berdo, P.C.

(57) ABSTRACT

A hydraulic shock absorber includes: an expansion-side passage and a contraction-side passage that connect an expansion-side chamber with a contraction-side chamber; an expansion-side valve body configured to open or close the expansion-side passage; a contraction-side valve body configured to open or close the contraction-side passage; an expansion-side back-pressure chamber configured to bias the expansion-side valve body; a contraction-side back-pressure chamber configured to bias the contraction-side valve body; a communicating channel communicating with the expansion-side back-pressure chamber through an expansion-side resistance element, and with the contraction-side back-pressure chamber through a contraction-side resistance element; an expansion-side pressure introduction passage connecting the expansion-side chamber with the contraction-side back-pressure chamber; a contraction-side pressure introduction passage connecting the contraction-side chamber with the expansion-side back-pressure chamber; a regulating passage connected to the communicating (Continued)

channel; and a solenoid pressure control valve in the regulating passage to control a pressure in the upstream of the regulating passage.

6 Claims, 2 Drawing Sheets

(51) Int. Cl.
    *F16F 9/46*     (2006.01)
    *B60G 13/08*     (2006.01)
    *F16F 9/06*     (2006.01)
    *F16F 9/19*     (2006.01)

(58) Field of Classification Search
    USPC .................. 188/281, 282.8, 282.9, 319.1
    See application file for complete search history.

(56) References Cited

U.S. PATENT DOCUMENTS

| | | | |
|---|---|---|---|
| 2007/0209892 A1 | 9/2007 | Masamura | |
| 2008/0257668 A1 | 10/2008 | Yamaguchi et al. | |
| 2009/0272611 A1* | 11/2009 | Hayama ................ | F16F 9/3485 |
| | | | 188/282.1 |

FOREIGN PATENT DOCUMENTS

| | | |
|---|---|---|
| JP | 2005-308178 A | 11/2005 |
| JP | 2008-267489 A | 11/2008 |

* cited by examiner

FIG. 1

FIG. 2

HYDRAULIC SHOCK ABSORBER

TECHNICAL FIELD

This invention relates to a hydraulic shock absorber.

BACKGROUND ART

In JP 2005-308178 A, there is discussed a damping force adjustable hydraulic shock absorber used as a vehicle suspension. This hydraulic shock absorber includes a cylinder, a piston that partitions the inside of the cylinder into an expansion-side chamber and a contraction-side chamber, a piston rod movably inserted into the cylinder with one end being connected to the piston, a passage provided in the piston to cause the expansion-side chamber and the contraction-side chamber to communicate with each other, a valve seat provided in the middle of the passage, a spool seated on or unseated from the valve seat to open or close the passage, an expansion-side pilot chamber that applies a pressure from the expansion-side chamber to a part of the back face of the spool, a contracting-side pilot chamber that applies a pressure from the contraction-side chamber to the other part of the back face of the spool, and solenoid pressure control valves provided in the middle of the expansion-side pilot passage and the contraction-side pilot passage to control pressures of the expansion-side pilot chamber and the contracting-side pilot chamber.

In this hydraulic shock absorber, damping forces of the expanding and contracting motions are controlled by controlling the pressure of the back-pressure chamber by using the solenoid pressure control valve. Specifically, the hydraulic shock absorber includes a first poppet valve provided in the middle of the expansion-side pilot passage to operate during an expanding motion, and a tubular second poppet valve arranged in the outer circumference of the first poppet valve and in the middle of the contraction-side pilot passage to operate during a contracting motion. In addition, the poppet valves are driven by a single solenoid. For this reason, a damping force of the hydraulic shock absorber is controlled independently between expanding and contracting motions.

SUMMARY OF INVENTION

In the hydraulic shock absorber described above, the first and second poppet valves are driven by a single solenoid. Therefore, pressed areas of each valve body and the like are set such that the first poppet valve is opened, and the second poppet valve is closed during an expanding motion, while the second poppet valve is opened, and the first poppet valve is closed during a contracting motion.

In this manner, the structure of the hydraulic shock absorber is very complicated. In addition, in a hydraulic shock absorber for a vehicle, typically, it is necessary to increase an expansion-side damping force. In the hydraulic shock absorber described above, in order to increase the expansion-side damping force, it is necessary to increase a pressure of the expansion-side pilot chamber. In order to drive the first poppet valve resisting to such a high pressure, it is necessary to provide a solenoid capable of exerting a strong actuating force. Since the solenoid capable of exerting a strong actuating force typically has a large size, a size of the hydraulic shock absorber installed with this large-sized solenoid also increases. For this reason, accessibility of the hydraulic shock absorber to a vehicle may be degraded. In addition, if the damping force is set to be large when an electric current does not flow, for example, during a failure, power consumption disadvantageously increases even in a reduced damping force.

In view of the aforementioned problems, it is therefore an object of the present invention to provide a hydraulic shock absorber having a solenoid pressure control valve for changing a damping force, by which the structure can be simplified and miniaturized, and the power consumption can be reduced.

According to one aspect of the present invention, a hydraulic shock absorber includes: a cylinder; a piston slidably inserted into the cylinder to partition the inside of the cylinder into an expansion-side chamber and a contraction-side chamber; an expansion-side passage and a contraction-side passage that connect the expansion-side chamber with the contraction-side chamber; an expansion-side valve body configured to open or close the expansion-side passage; a contraction-side valve body configured to open or close the contraction-side passage; an expansion-side back-pressure chamber configured to press an expansion-side spool abutting on the expansion-side valve body by virtue of an internal pressure, the expansion-side back-pressure chamber being configured to bias the expansion-side valve body to close the expansion-side passage; a contraction-side back-pressure chamber configured to press a contraction-side spool abutting on the contraction-side valve body by virtue of an internal pressure, the contraction-side back-pressure chamber being configured to bias the contraction-side valve body to close the contraction-side passage; a communicating channel that communicates with the expansion-side back-pressure chamber through an expansion-side resistance element configured to generate resistance to a passing liquid flow, the communicating channel communicating with the contraction-side back-pressure chamber through a contraction-side resistance element configured to generate resistance to a passing liquid flow; an expansion-side pressure introduction passage configured to permit only a liquid flow directed from the expansion-side chamber to the contraction-side back-pressure chamber; a contraction-side pressure introduction passage configured to permit only a liquid flow directed from the contraction-side chamber to the expansion-side back-pressure chamber; a regulating passage connected to the communicating channel; a contraction-side discharge passage that connects the downstream of the regulating passage with the expansion-side chamber, the contraction-side discharge passage being configured to permit only a liquid flow directed from the regulating passage to the expansion-side chamber; an expansion-side discharge passage that connects the downstream of the regulating passage with the contraction-side chamber, the expansion-side discharge passage being configured to permit only a liquid flow directed from the regulating passage to the contraction-side chamber; and a solenoid pressure control valve provided in the regulating passage to control a pressure in the upstream of the regulating passage. An expansion-side load for biasing the expansion-side valve body by virtue of the pressure of the expansion-side back-pressure chamber is larger than a contraction-side load for biasing the contraction-side valve body by virtue of the pressure of the contraction-side back-pressure chamber.

DESCRIPTION OF EMBODIMENTS

Figure 1:
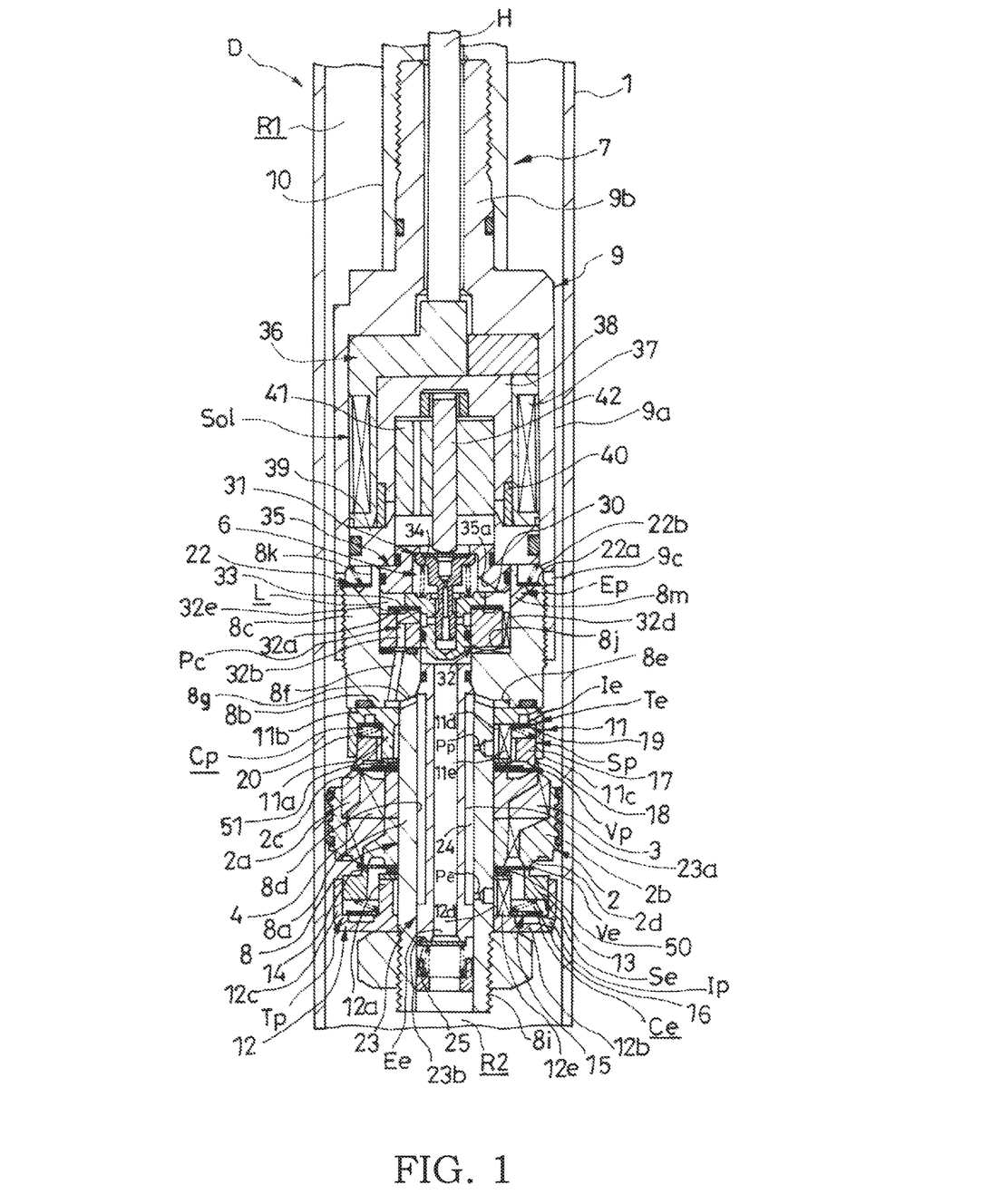
FIG. 1 is a cross-sectional view illustrating a hydraulic shock absorber according to an embodiment of this invention.

A description will now be made for a hydraulic shock absorber according to an embodiment of this invention with reference to the accompanying drawings. It is noted that, in the following description, an upward direction in FIGS. 1 and 2 will be referred to as an "upper (such as an upper side, an upper end, or an upper surface)," and a downward direction in FIGS. 1 and 2 will be referred to as a "lower (such as a lower side, a lower end, or a lower surface). As illustrated in FIG. 1, a hydraulic shock absorber D includes a cylinder 1, a piston 2 slidably inserted into the cylinder 1 to partition the inside of the cylinder 1 into an expansion-side chamber R1 and a contraction-side chamber R2, expansion-side and contraction-side passages 3 and 4 that cause the expansion-side chamber R1 and the contraction-side chamber R2 to communicate with each other, an expansion-side valve body Ve that opens or closes the expansion-side passage 3, a contraction-side valve body Vp that opens or closes the contracting-side passage 4, an expansion-side back-pressure chamber Ce that presses the expansion-side spool Se abutting on the expansion-side valve body Ve by virtue of an internal pressure and biases the expansion-side valve body Ve to close the expansion-side passage 3, a contraction-side back-pressure chamber Cp that presses a contraction-side spool Sp abutting on the contraction-side valve body Vp by virtue of an internal pressure and biases the contraction-side valve body Vp to close the contraction-side passage 4, a communicating channel 24 that communicates with the expansion-side back-pressure chamber Ce through an expansion-side pilot orifice Pe as an expansion-side resistance element for generating resistance to a passing liquid flow and communicates with the contraction-side back-pressure chamber Cp through a contraction-side pilot orifice Pp as a contraction-side resistance element for generating resistance to a passing liquid flow, an expansion-side pressure introduction passage Ie that permits only a liquid flow directed from the expansion-side chamber R1 to the contraction-side back-pressure chamber Cp, a contraction-side pressure introduction passage Ip that permits only a liquid flow directed from the contraction-side chamber R2 to the expansion-side back-pressure chamber Ce, a regulating passage Pc connected to the communicating channel 24, a contraction-side discharge passage Ep that causes a downstream of the regulating passage Pc to communicate with the expansion-side chamber R1 and permits only a liquid flow directed from the regulating passage Pc to the expansion-side chamber R1, an expansion-side discharge passage Ee that causes a downstream of the regulating passage Pc to communicate with the contraction-side chamber R2 and permits only a liquid flow directed from the regulating passage Pc to the contraction-side chamber R2, and a solenoid pressure control valve 6 provided in the regulating passage Pc to control a pressure in the upstream of the regulating passage Pc.

The expansion-side chamber R1 and the contraction-side chamber R2 of the hydraulic shock absorber D are filled with hydraulic oil as a hydraulic fluid. A free piston (not shown) sliding inside the cylinder 1 is provided under the cylinder 1. A gas chamber (now shown) inside the cylinder 1 is formed by this free piston. The piston 2 is connected to one end of the piston rod 7 movably inserted into the cylinder 1. The other end of the piston rod 7 protrudes outward from the upper end of the cylinder 1. The inside of the cylinder 1 is maintained in a liquid tight state by a seal (not shown) provided between the piston rod 7 and the cylinder 1. The hydraulic shock absorber D is a so-called single rod type. Therefore, a volume change is generated by the piston rod 7 inserted into or extracted from the inside of the cylinder 1 in synchronization with an expanding or contracting motion of the hydraulic shock absorber D. This volume change is compensated by the free piston moving upward or downward inside the cylinder 1 as a gas volume inside the gas chamber increases or decreases. This volume change may be compensated by using a reservoir provided separately in the outer circumference or the outside of the cylinder 1.

The piston rod 7 includes a piston holding member 8 that holds the piston 2, a solenoid valve housing cylinder 9 having one end connected to the piston holding member 8 to form a hollow housing portion L for housing the solenoid pressure control valve 6 in conjunction with the piston holding member 8, and a rod member 10 having one end connected to the solenoid valve housing cylinder 9 and the other end protruding outward from the upper end of the cylinder 1.

The piston holding member 8 has a holding shaft 8a having outer circumference where the annular piston 2 is mounted, a flange 8b provided in an upper outer circumference of the holding shaft 8a to extend outward in a radial direction, and a hollow cylindrical socket 8c provided in an outer circumference of an upper end of the flange 8b. The piston holding member 8 further has a vertical hole 8d that is opened on a leading end surface of the holding shaft 8a and communicates with the socket 8c extending in an axial direction, an annular trench 8e formed to surround the holding shaft 8a on the lower end surface of he flange 8b, a port 8f that causes the annular trench 8e and the inside of the socket 8c to communicate with each other, a horizontal hole 8g that causes the annular trench 8e and the vertical hole 8d to communicate with each other, an expansion-side pilot orifice Pe opened on an outer circumferential surface of the holding shaft 8a and provided in a passage communicating with the vertical hole 8d, a contraction-side pilot orifice Pp opened on an outer circumferential surface of the holding shaft 8a and provided in a passage communicating with the vertical hole 8d, a thread portion 8i provided in the outer circumference of the lower end of the holding shaft 8a, and a trench 8j formed on the upper end surface of the flange 8b to communicate with the vertical hole 8d.

A hollow cylindrical separator 23 is inserted into the inside of the vertical hole 8d provided in the holding shaft 8a. An annular trench 23a is formed on the outer circumferential surface of the separator 23. The annular trench 23a forms a communicating channel 24 that causes the expansion-side pilot orifice Pe, the contraction-side pilot orifice Pp, and the horizontal hole 8g to communicate with each other in conjunction with the inner circumferential surface of the vertical hole 8d. That is, inside the vertical hole 8d, the separator 23 causes the contraction-side chamber R2 and the inside of the socket 8c to communicate with each other through a hole penetrating through the separator 23 and shuts off communication between: the expansion-side pilot orifice Pe, the contraction-side pilot orifice Pp, and the horizontal hole 8g; and the contraction-side chamber R2 and the inside of the socket 8c. In addition, the lower end surface of the separator 23 is provided with an annular valve seat 23b protruding downward and surrounding the opening of the lower end.

It is noted that the expansion-side resistance element and the contraction-side resistance element are not limited to the orifice, and any structure may also be employed if it can generate resistance to the passing liquid flow. For example, a throttle structure such as a choke passage or a resistance valve such as a leaf valve or a poppet valve may be employed.

The outer circumference of the upper end of the socket 8c is provided with an annular concave portion 8k. In addition, the socket 8c is provided with a through-hole 8m perforated from the concave portion 8k to the inside of the socket 8c. The inside of the concave portion 8k is provided with an annular disk 22a that covers the opening end of the through-hole 8m and a spring member 22b that biases the annular disk 22a from the upside. The annular disk 22a is biased by the spring member 22b to block the through-hole 8m.

The solenoid valve housing cylinder 9 has a capped cylindrical housing tube portion 9a, a tubular connecting portion 9b having an outer diameter smaller than that of the housing tube portion 9a and extending upward from an apex of the housing tube portion 9a, and an penetrating hole 9c that is opened on the outer circumferential surface of the housing tube portion 9a and communicates with the inside. The housing portion L for housing the solenoid pressure control valve 6 is formed by screwing the socket 8c of the piston holding member 8 to the inner circumference of the housing tube portion 9a of the solenoid valve housing cylinder 9. The housing portion L communicates with the communicating channel 24 through the port 8f, the annular trench 8e, and the horizontal hole 8g described above. The port 8f, the annular trench 8e, and the horizontal hole 8g constitute a part of the regulating passage Pc. It is noted that a passage for causing the housing portion L and the communicating channel 24 to communicate with each other is not limited to the port 8f, the annular trench 8e, and the horizontal hole 8g described above. The housing portion L and the communicating channel 24 may directly communicate with each other. If the port 8f, the annular trench 8e, and the horizontal hole 8g are employed, it is possible to facilitate fabrication of the passage for causing the housing portion L and the communicating channel 24 to communicate with each other.

If the solenoid valve housing cylinder 9 is integrated with the piston holding member 8, the penetrating hole 9c is arranged to face the concave portion 8k and causes the housing portion L and the expansion-side chamber R1 to communicate with each other in conjunction with the through-hole 8m. The annular disk 22a and the spring member 22b described above constitute a check valve 22 that permits only a liquid flow directed from the inside of the housing portion L to the expansion-side chamber R1. The contraction-side discharge passage Ep is formed by the penetrating hole 9c, the concave portion 8k, the through-hole 8m, and the check valve 22.

The inside of the vertical hole 8d of the piston holding member 8 is provided with a check valve 25 seated on or unseated from the annular valve seat 23b of the separator 23. The check valve 25 inhibits a liquid flow directed from the contraction-side chamber R2 to the housing portion L and permits only a liquid flow directed from the housing portion L to the contraction-side chamber R2. The expansion-side discharge passage Ee is formed by the separator 23 and the check valve 25 inside the vertical hole 8d.

The rod member 10 has a tubular shape. The connecting portion 9b of the solenoid valve housing cylinder 9 is screwed to an inner circumference of the lower end of the rod member 10. In this manner, the piston rod 7 is formed by integrating the rod member 10, the solenoid valve housing cylinder 9, and the piston holding member 8.

A harness H for supplying electric power to the solenoid described below is inserted into the inside of the rod member 10 and the inside of the connecting portion 9b of the solenoid valve housing cylinder 9. The upper end of the harness H extends outward from the upper end of the rod member 10 and is connected to a controller and a power supply (not shown).

The annular piston 2 is assembled to the outer circumference of the holding shaft 8a of the piston holding member 8. The contraction-side valve body Vp, the contraction-side spool Sp, and a contraction-side housing 11 that forms the contraction-side back-pressure chamber Cp are assembled to the upper side of the piston 2. The expansion-side valve body Ve, the expansion-side spool Se, and an expansion-side housing 12 that forms the expansion-side back-pressure chamber Ce are assembled to the lower side of the piston 2.

The piston 2 is formed by overlapping bisected upper and lower disks 2a and 2b. An expansion-side passage 3 and a contraction-side passage 4 for causing the expansion-side chamber R1 and the contraction-side chamber R2 to communicate with each other are formed inside the piston 2. The expansion-side passage 3 and the contraction-side passage 4 are formed in the holes provided in the bisected disks 2a and 2b, respectively. For this reason, the expansion-side passage 3 and the contraction-side passage 4 having complicated shapes can be formed without necessity of a complicated machining. Therefore, it is possible to manufacture the piston 2 inexpensively and easily. In FIG. 1, an annular valve seat 2c surrounding the outer circumference of the opening end of the contraction-side passage 4 is provided on the upper end surface of the upper disk 2a, and an annular valve seat 2d surrounding the outer circumference of the opening end of the expansion-side passage 3 is provided on the lower end surface of the lower disk 2b.

The expansion-side valve body Ve is a perforated disk member having a hole formed in its center where the holding shaft 8a of the piston holding member 8 is inserted. The expansion-side valve body Ve is stacked on the lower end of the piston 2 and is fixed to the holding shaft 8a by nipping its inner circumference side between the piston 2 and the expansion-side housing 12. The expansion-side valve body Ve is seated on the valve seat 2d to block the expansion-side passage 3. In addition, downward deformation is allowed in the outer circumference side of the expansion-side valve body Ve. For this reason, the expansion-side valve body Ve can open the expansion-side passage 3 by virtue of this deformation. More specifically, a spacer 50 is interposed between the expansion-side valve body Ve and the expansion-side housing 12, so that the expansion-side valve body Ve can be deformed in its outer circumference side from a portion supported by the spacer 50.

The expansion-side housing 12 includes a tubular mount portion 12a fitted to the outer circumference of the holding shaft 8a, a flange portion 12b provided from the lower end of the mount portion 12a to the outer circumference side, and a sliding tube 12c extending from the outer circumference of the flange portion 12b to the piston 2 side.

The expansion-side spool Se having the annular spool body 13 and the annular projection 14 protruding from the inner circumference of the upper end of the spool body 13 is housed in the sliding tube 12c. The outer circumference of the expansion-side spool Se makes sliding contact with the inner circumference of the sliding tube 12c, so that the expansion-side spool Se can move inside the sliding tube 12c along the axial direction. The annular projection 14 abuts on the lower surface as a back side of the expansion-side valve body Ve.

As the expansion-side spool Se is inserted into the expansion-side housing 12, an expansion-side back-pressure chamber Ce partitioned by the expansion-side spool Se, the expansion-side housing 12, and the expansion-side valve body Ve is formed. The expansion-side back-pressure chamber Ce is arranged in the lower side as a back side of the expansion-side valve body Ve. The inner diameter of the spool body 13 may be larger than the outer diameter of the mount portion 12a or may be sized to make sliding contact with the outer circumference of the mount portion 12a. When the spool body 13 makes sliding contact with the outer circumference of the mount portion 12a and the inner circumference of the sliding tube 12c, the expansion-side back-pressure chamber Ce is encapsulated by the expansion-side spool Se.

An annular trench 12d is provided in the inner circumference of the mount portion 12a of the expansion-side housing 12. In addition, the mount portion 12a is provided with a notch 12e extending from the outer circumference of the mount portion 12a to the annular trench 12d. While the expansion-side housing 12 is assembled to the holding shaft 8a, the annular trench 12d is arranged to face the expansion-side pilot orifice Pe provided in the holding shaft 8a. For this reason, the expansion-side back-pressure chamber Ce communicates with the communicating channel 24 through the expansion-side pilot orifice Pe, the annular trench 12d, and the notch 12e.

The expansion-side housing 12 further has a contraction-side pressure introduction passage Ip that causes the contraction-side chamber R2 and the expansion-side back-pressure chamber Ce to communicate with each other. The contraction-side pressure introduction passage Ip has one end opened to the outer circumferential surface of the flange portion 12b and the other end opened to the upper surface of the flange portion 12b. An annular disk 15 is stacked on the upper surface of the flange portion 12b of the expansion-side housing 12. The annular disk 15 is pressed toward the flange portion 12b by the spring member 16 interposed between the annular disk 15 and the spool body 13 of the expansion-side spool Se to block the opening end of the contraction-side pressure introduction passage Ip. The contraction-side pressure introduction passage Ip is formed not to generate resistance to the passing liquid flow.

As the pressure of the contraction-side chamber R2 increases during a contracting motion of the hydraulic shock absorber D, the annular disk 15 is pressed by this pressure and is unseated from the flange portion 12b so as to open the contraction-side pressure introduction passage Ip. Meanwhile, during an expanding motion of the hydraulic shock absorber D in which the pressure of the expansion-side back-pressure chamber Ce is higher than the pressure of the contraction-side chamber R2, the annular disk 15 is pressed to the flange portion 12b so as to block the contraction-side pressure introduction passage Ip. In this manner, the annular disk 15 and the spring member 16 constitute a contraction-side check valve Tp that permits only a liquid flow from the contraction-side chamber R2, and the annular disk 15 serves as a valve body thereof. As the contraction-side check valve Tp is provided, the contraction-side pressure introduction passage Ip acts as a one-way passage that permits only a liquid flow directed from the contraction-side chamber R2 to the expansion-side back-pressure chamber Ce.

The spring member 16 biases the annular disk 15 toward the flange portion 12b and biases the expansion-side spool Se toward the expansion-side valve body Ve. If the expansion-side valve body Ve is deformed to press the expansion-side spool Se downward, and the deformation of the expansion-side valve body Ve is then released, the expansion-side spool Se is rapidly returned to its original position of FIG. 1 to follow the expansion-side valve body Ve because the expansion-side spool Se is biased by the spring member 16. The spring member that biases the expansion-side spool Se may be provided separately from the spring member 16 of the contraction-side check valve Tp. The spring member that biases the expansion-side spool Se and the spring member 16 of the contraction-side check valve Tp may be integrated into a single spring member. As a result, it is possible to reduce the number of components and simplify the structure. It is noted that the outer diameter of the expansion-side spool Se is set to be larger than the inner diameter of the annular projection 14 abutting on the expansion-side valve body Ve. Therefore, the expansion-side spool Se is biased toward the expansion-side valve body Ve by virtue of the pressure of the expansion-side back-pressure chamber Ce at all times. For this reason, if the spring member is provided to bias only the expansion-side spool Se, it may be omitted.

Similar to the expansion-side valve body Ve, the contraction-side valve body Vp stacked on the piston 2 is a perforated disk member. The contraction-side valve body Vp is stacked on the upper end of the piston 2, and its inner circumference side is nipped between the piston 2 and the contraction-side housing 11, so that the contraction-side valve body Vp is fixed to the holding shaft 8a. The contraction-side valve body Vp is seated on the valve seat 2c to block the contraction-side passage 4. In addition, upward deformation is allowed in the outer circumference side of the contraction-side valve body Vp. For this reason, the contraction-side valve body Vp can open the contraction-side passage 4 by virtue of this deformation. More specifically, a spacer 51 is interposed between the contraction-side valve body Vp and the contraction-side housing 11, and the contraction-side valve body Vp can be deformed in its outer circumference side from a portion supported by the spacer 51.

The contraction-side housing 11 includes a tubular mount portion 11a fitted to the outer circumference of the holding shaft 8a, a flange portion 11b provided from the upper end of the mount portion 11a to the outer circumference side, and a sliding tube 11c extending from the outer circumference of the flange portion 11b toward the piston 2.

A contraction-side spool Sp having an annular spool body 17 and an annular projection 18 protruding from the outer circumference of the lower end of the spool body 18 is housed in the sliding tube 11c. The outer circumference of the contraction-side spool Sp makes sliding contact with the inner circumference of the sliding tube 11c, so that it can move along the axial direction inside the sliding tube 11c. The annular projection 18 abuts on the upper surface as a back side of the contraction-side valve body Vp.

As the contraction-side spool Sp is inserted into the contraction-side housing 11, a contraction-side back-pressure chamber Cp partitioned by the contraction-side spool Sp, the contraction-side housing 11, and the contraction-side valve body Vp is formed. The contraction-side back-pressure chamber Cp is arranged in the upper side as a back side of the contraction-side valve body Vp. The inner diameter of the spool body 17 may be larger than the outer diameter of the mount portion 11a or may be sized to make sliding contact with the outer circumference of the mount portion 11a. When the spool body 17 makes sliding contact with the outer circumference of the mount portion 11a and the inner circumference of the sliding tube 11c, the contraction-side back-pressure chamber Cp is encapsulated by the contraction-side spool Sp.

An annular trench 11d is provided in the inner circumference of the mount portion 11a of the contraction-side housing 11, and a notch 11e extending from the outer circumference of the mount portion 11a to the annular trench 11d is provided in the mount portion 11a. While the contraction-side housing 11 is assembled to the holding shaft 8a, the annular trench 11d is arranged to face the contraction-side pilot orifice Pp provided in the holding shaft 8a. For this reason, the contraction-side back-pressure chamber Cp communicates with the communicating channel 24 through the contraction-side pilot orifice Pp, the annular trench 11d, and the notch 11e.

The contraction-side housing 11 further has the expansion-side pressure introduction passage Ie that causes the expansion-side chamber R1 and the contraction-side back-pressure chamber Cp to communicate with each other. The expansion-side pressure introduction passage Ie has one end opened to the outer circumferential surface of the flange portion 11b and the other end opened to the lower surface of the flange portion 11b. An annular disk 19 is stacked on the lower surface of the flange portion 11b of the contraction-side housing 11. The annular disk 19 is pressed to the flange portion 11b by the spring member 20 interposed between the annular disk 19 and the spool body 17 of the contraction-side spool Sp so as to block the opening end of the expansion-side pressure introduction passage Ie. The expansion-side pressure introduction passage Ie is formed not to generate resistance to the passing liquid flow.

As the pressure of the expansion-side chamber R1 increases during an expanding motion of the hydraulic shock absorber D, the annular disk 19 is pressed by this pressure and is unseated from the flange portion 11b to open the expansion-side pressure introduction passage Ie. Meanwhile, during a contracting motion of the hydraulic shock absorber D in which the pressure of the contraction-side back-pressure chamber Cp is higher than the pressure of the expansion-side chamber R1, the annular disk 19 is pressed to the flange portion 11b so as to block the expansion-side pressure introduction passage Ie. In this manner, the annular disk 19 and the spring member 20 constitute an expansion-side check valve Te that permits only a liquid flow from the expansion-side chamber R1, and the annular disk 19 serves as a check valve body thereof. As the expansion-side check valve Te is provided, the expansion-side pressure introduction passage Ie acts as a one-way passage that permits only a liquid flow directed from the expansion-side chamber R1 to the contraction-side back-pressure chamber Cp.

The spring member 20 biases the annular disk 19 toward the flange portion 11b and biases the contraction-side spool Sp toward the contraction-side valve body Vp. If the contraction-side valve body Vp is deformed to force the contraction-side spool Sp to move upward, and the deformation of the contraction-side valve body Vp is then released, the contraction-side spool Sp is rapidly returned to its original position of FIG. 1 to follow the contraction-side valve body Vp because it is biased by the spring member 20. The spring member that biases the contraction-side spool Sp may be provided separately from the spring member 20 of the expansion-side check valve Te. The spring member that biases the contraction-side spool Sp and the spring member 20 of the expansion-side check valve Te may be integrated into a single spring member. As a result, it is possible to reduce the number of components and simplify the structure. It is noted that the outer diameter of the contraction-side spool Sp is set to be larger than the inner diameter of the annular projection 18 abutting on the contraction-side valve body Vp. Therefore, the contraction-side spool Sp is biased toward the contraction-side valve body Vp by virtue of the pressure of the contraction-side back-pressure chamber Cp at all times. For this reason, if the spring member is provided to bias only the contraction-side spool Sp, it may be omitted.

In this manner, the expansion-side back-pressure chamber Ce and the contraction-side back-pressure chamber Cp communicate with each other through the expansion-side pilot orifice Pe, the contraction-side pilot orifice Pp, and the communicating channel 24. In addition, the expansion-side back-pressure chamber Ce communicates with the expansion-side chamber R1 through the expansion-side pressure introduction passage Ie and the contraction-side back-pressure chamber Cp, and the contraction-side back-pressure chamber Cp communicates with the contraction-side chamber R2 through the contraction-side pressure introduction passage Ip and the expansion-side back-pressure chamber Ce. Furthermore, the communicating channel 24 that causes the expansion-side back-pressure chamber Ce and the contraction-side back-pressure chamber Cp to communicate with each other also communicates with the housing portion L through the annular trench 8e, the port 8f, and the horizontal hole 8g as described above. For this reason, the expansion-side back-pressure chamber Ce and the contraction-side back-pressure chamber Cp also communicate with the housing portion L.

A pressed area of the expansion-side spool Se pressed by the pressure of the expansion-side back-pressure chamber Ce corresponds to a difference obtained by subtracting an area of a circle formed by setting the inner diameter of the annular projection 14 as a diameter from an area of a circle formed by setting the outer diameter of the expansion-side spool Se as a diameter. Similarly, a pressed area of the contraction-side spool Sp pressed by the pressure of the contraction-side back-pressure chamber Cp corresponds to a difference obtained by subtracting an area of a circle formed by setting the inner diameter of the annular projection 18 as a diameter from an area of a circle formed by setting the outer diameter of the contraction-side spool Sp as a diameter. In addition, in the hydraulic shock absorber D according to this embodiment, the pressed area of the expansion-side spool Se is set to be larger than the pressed area of the contraction-side spool Sp.

The annular projection 14 of the expansion-side spool Se abuts on the back side of the expansion-side valve body Ve. In addition, the inner circumference side of the expansion-side valve body Ve is supported by the spacer 50. For this reason, the pressed area of the expansion-side valve body Ve where the pressure of the expansion-side back-pressure chamber Ce is directly applied is obtained by subtracting an area of a circle formed by setting the outer diameter of the spacer 50 as a diameter from an area of a circle formed by setting the inner diameter of the annular projection 14 as a diameter. Therefore, a force obtained by multiplying the pressure of the expansion-side back-pressure chamber Ce by the area obtained by subtracting the area of the circle formed by setting the outer diameter of the spacer 50 as a diameter from the area of the circle formed by setting the outer diameter of the expansion-side spool Se as a diameter corresponds to an expansion-side load of the expansion-side valve body Ve pressed toward the piston 2.

The annular projection 18 of the contraction-side spool Sp abuts on the back side of the contraction-side valve body Vp. In addition, the inner circumference side of the contraction-side valve body Vp is supported by the spacer 51. For this reason, the pressed area of the contraction-side valve body Vp where the pressure of the contraction-side back-pressure chamber Cp is directly applied corresponds to the area obtained by subtracting the area of the circle formed by setting the outer diameter of the spacer 51 as a diameter from the area of the circle formed by setting the inner diameter of the annular projection 18 as a diameter. Therefore, a force obtained by multiplying the pressure of the contraction-side back-pressure chamber Cp by the area obtained by subtracting the area of the circle formed by setting the outer diameter of the spacer 51 as a diameter from the area of the circle formed by setting the outer diameter of the contraction-side spool Sp as a diameter corresponds to a contraction-side load of the contraction-side valve body Vp pressed toward the piston 2.

As described above, in the hydraulic shock absorber D according to this embodiment, the pressed area of the expansion-side spool Se is set to be larger than the pressed area of the contraction-side spool Sp. Therefore, when the pressure of the expansion-side back-pressure chamber Ce is equal to the pressure of the contraction-side back-pressure chamber Cp, the expansion-side load of the expansion-side valve body Ve pressed by the expansion-side back-pressure chamber Ce is larger than the contraction-side load of the contraction-side valve body Vp pressed by the contraction-side back-pressure chamber Cp. It is noted that, when the expansion-side back-pressure chamber Ce is encapsulated by the expansion-side spool Se, and the pressure of the expansion-side back-pressure chamber Ce is not directly applied to the expansion-side valve body Ve, the expansion-side load is determined only by the pressed area of the expansion-side spool Se pressed by the pressure of the expansion-side back-pressure chamber Ce. Similarly, in the contraction side, when the contraction-side back-pressure chamber Cp is encapsulated by the contraction-side spool Sp, and the pressure of the contraction-side back-pressure chamber Cp is not directly applied to the contraction-side valve body Vp, the contraction-side load is determined only by the pressed area of the contraction-side spool Sp pressed by the pressure of the contraction-side back-pressure chamber Cp. For this reason, when the pressures of the back-pressure chambers Ce and Cp are not directly applied to the expansion-side valve body Ve and the contraction-side valve body Vp, the pressed area of the expansion-side spool Se may be set to be larger than the pressed area of the contraction-side spool Sp in order to set the expansion-side load of the expansion-side valve body Ve to be higher than the contraction-side load of the contraction-side valve body Vp. Furthermore, the pressure of the expansion-side back-pressure chamber Ce may be directly applied to the expansion-side valve body Ve while the pressure of the contraction-side back-pressure chamber Cp may not be directly applied to the contraction-side valve body Vp, and vice versa. According to this embodiment, since the expansion-side spool Se and the contraction-side spool Sp are provided, it is possible to set the areas pressed by the pressures of the back-pressure chambers Ce and Cp to be larger, compared to a case where the pressures of the back-pressure chambers Ce and Cp are applied to only the valve bodies Ve and Vp. Furthermore, since the pressed area of the contraction-side spool Sp and the pressed area of the expansion-side spool Se can be set independently, a significant difference can be given between the expansion-side load and the contraction-side load. That is, it is possible to freely set a relationship between the expansion-side load and the contraction-side load.

The regulating passage Pc is a passage that causes an upstream including the expansion-side back-pressure chamber Ce and the contraction-side back-pressure chamber Cp and a downstream including the expansion-side discharge passage Ee and the contraction-side discharge passage Ep to communicate with each other. The solenoid pressure control valve 6 is provided in the regulating passage Pc to control the pressures of the expansion-side back-pressure chamber Ce and the contraction-side back-pressure chamber Cp in the upstream at the same time. As described above, the pressed area pressed by the pressure of the expansion-side back-pressure chamber Ce is set to be larger than the pressed area pressed by the pressure of the contraction-side back-pressure chamber Cp. For this reason, when the pressure of the expansion-side back-pressure chamber Ce and the pressure of the contraction-side back-pressure chamber Cp are controlled by the solenoid pressure control valve 6 to be equal, the expansion-side load becomes larger than the contraction-side load. In other words, the pressures of the back-pressure chambers Ce and Cp to be controlled by the solenoid pressure control valve 6 in order to obtain the same predetermined level of the load are lower in a case where the expansion-side load is set to a predetermined level, compared to a case where the contraction-side load is set to a predetermined level.

According to this embodiment, the inner circumference of the expansion-side spool Se does not make sliding contact with the outer circumference of the mount portion 12*a* of the expansion-side housing 12. In addition, the pressure of the expansion-side back-pressure chamber Ce is also applied inward of the radial direction on the back side of the expansion-side valve body Ve from a portion where the annular projection 14 abuts. For this reason, in setting of the expansion-side load, the load directly applied to the expansion-side valve body Ve by the pressure of the expansion-side back-pressure chamber Ce may be added. In addition, the inner circumference of the contraction-side spool Sp does not also make sliding contact with the outer circumference of the mount portion 11*a* of the contraction-side housing 11, and the pressure of the contraction-side back-pressure chamber Cp is also applied inward of the radial direction on the back side of the contraction-side valve body Vp from a portion where the annular projection 18 abuts. For this reason, in setting of the contraction-side load, the load directly applied by the pressure of the contraction-side back-pressure chamber Cp to the contraction-side valve body Vp may be added.

The inner circumferences of the expansion-side valve body Ve and the contraction-side valve body Vp are fixed to the piston rod 7. Instead, the expansion-side valve body Ve and the contraction-side valve body Vp may be supported by the piston rod 7 in a floating manner, so that both the valve bodies Ve and Vp can be spaced from the piston 2.

The solenoid pressure control valve 6 closes the regulating passage Pc when it is not electrically conducted. The solenoid pressure control valve 6 performs the pressure control when it is electrically conducted. In addition, a failsafe valve FV that detours the solenoid pressure control valve 6 is provided in the middle of the regulating passage Pc.

Figure 2:
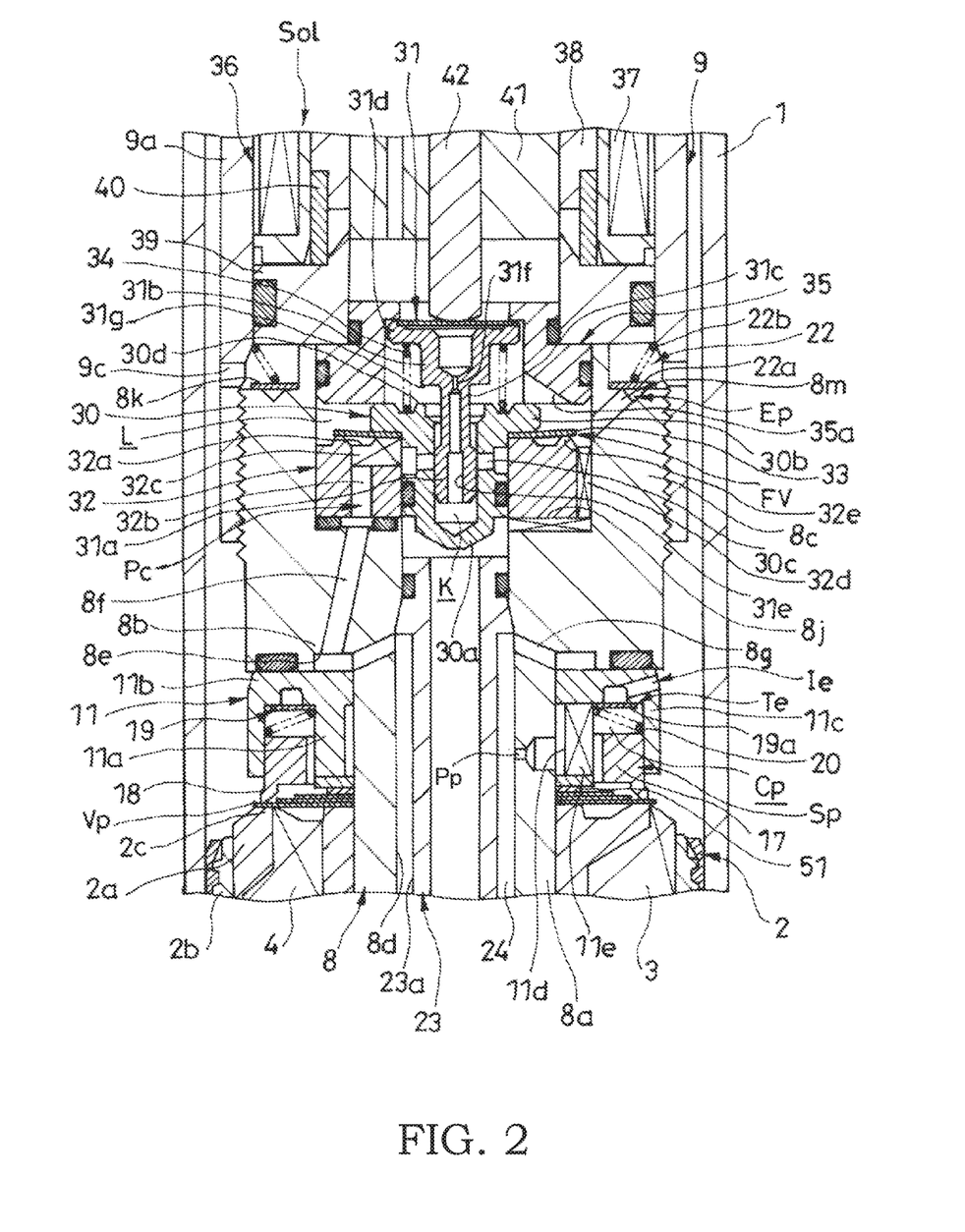
FIG. 2 is a partially enlarged cross-sectional view illustrating a hydraulic shock absorber according to an embodiment of this invention.

As illustrated in FIGS. 1 and 2, the solenoid pressure control valve 6 includes a valve seat member 30 where a valve housing tube 30*a* and a control valve seat 30*d* are formed, a solenoid valve body 31 partially inserted into the valve housing tube 30*a* and seated on or unseated from the control valve seat 30*d*, and a solenoid Sol that exerts an actuating force to the solenoid valve body 31 to drive the solenoid valve body 31 in the axial direction.

The valve seat member 30 is inserted into and fixed to the annular valve housing 32 fitted to the inside of the socket 8*c* of the piston holding member 8. Specifically, the valve housing tube 30a of the valve seat member 30 is inserted into the inner circumference of the valve housing 32 arranged on the upper end of the flange 8b. As a result, the valve seat member 30 is positioned in the radial direction and is housed in the housing portion L.

As illustrated in FIG. 2, the valve housing 32 includes an annular concave portion 32a formed in the upper end, a port 32b opened in the annular concave portion 32a and perforated to the lower end of the valve housing 32, a chamfered trench 32c formed in the inner circumference side of the upper end to communicate with the port 32b, a trench 32d provided along the axial direction on the outer circumferential surface, and an annular failsafe valve seat 32e surrounding the outer circumference side of the annular concave portion 32a and protruding upward.

As the valve housing 32 is inserted into the socket 8c, the port 32b faces the port 8f opened on the upper end surface of the flange 8b, and the port 32b and the chamfered trench 32c communicate with the port 8f.

In addition, the trench 32d communicates with the trench 8j provided in the flange 8b.

Therefore, the port 32b and the chamfered trench 32c communicate with the communicating channel 24 through the annular trench 8e, the port 8f, and the horizontal hole 8g. In addition, the port 32b and the chamfered trench 32c communicate with the expansion-side back-pressure chamber Ce and the contraction-side back-pressure chamber Cp through the communicating channel 24, the expansion-side pilot orifice Pe, and the contraction-side pilot orifice Pp. Meanwhile, the trench 32d communicates with a hole penetrating through the separator 23 through the trench 8j and communicates with the contraction-side chamber R2 through the expansion-side discharge passage Ee. Furthermore, the trench 32d communicates with the expansion-side chamber R1 through the contraction-side discharge passage Ep formed by the penetrating hole 9c, the concave portion 8k, the through-hole 8m, and the check valve 22.

The valve seat member 30 includes a valve housing tube 30a having a bottomed cylindrical shape, a flange 30b formed in the outer circumference of the upper end of the valve housing tube 30a to extend outward in the radial direction, a penetrating hole 30c opened on the outer circumferential surface of the valve housing tube 30a and connected to the inside, and an annular control valve seat 30d that is formed on the upper end of the valve housing tube 30a and protrudes upward.

The failsafe valve body 33 as an annular leaf valve is mounted to the outer circumference of the valve housing tube 30a of the valve seat member 30. The failsafe valve body 33 is fixed such that its inner circumference side is nipped between the flange 30b of the valve seat member 30 and the inner circumference of the upper end of the valve housing 32. The failsafe valve body 33 is seated on the annular failsafe valve seat 32e of the valve housing 32 to block the annular concave portion 32a while its outer circumference side is initially deformed. The failsafe valve body 33 is deformed to open the annular concave portion 32a as the pressure applied to the inside of the annular concave portion 32a through the port 32b reaches a valve open pressure. In this case, the port 32b communicates with the expansion-side discharge passage Ee and the contraction-side discharge passage Ep. The failsafe valve body 33 and the failsafe valve seat 32e constitute the failsafe valve FV.

As the valve seat member 30 is assembled to the valve housing 32, the chamfered trench 32c of the valve housing 32 faces the penetrating hole 30c of the valve housing tube 30a, and the inside of the valve housing tube 30a communicates with the expansion-side back-pressure chamber Ce and the contraction-side back-pressure chamber Cp through the port 32b.

Over the valve seat member 30, an annular valve fixing member 35 is arranged to abut on the upper end of the flange 30b. The solenoid Sol housed in the solenoid valve housing cylinder 9 is arranged over the valve fixing member 35. When the piston holding member 8 is screwed to the solenoid valve housing cylinder 9 for integration, the valve housing 32, the failsafe valve body 33, the valve seat member 30, the valve fixing member 35, and the solenoid Sol are interposed and fixed between the solenoid valve housing cylinder 9 and the piston holding member 8. It is noted that, even when the valve fixing member 35 abuts on the flange Sob of the valve seat member 30, the valve fixing member 35 is provided with the chamfered trench 35a to cause the inner circumferential space of the valve fixing member 35 and the outer circumferential space of the flange 30b to communicate with each other. This communication may be obtained through a hole such as a port instead of the chamfered trench 35a.

The solenoid Sol includes a capped cylindrical mold stator 36 obtained by integrating a coil 37 and a harness H for electrically conducting the coil 37 by using a mold resin, a capped cylindrical first stator core 38 fitted to the inner circumference of the mold stator 36, an annular second stator core 39 arranged in the lower end of the mold stator 36, a filler ring 40 interposed between the first and second stator cores 38 and 39 to form a magnetic cavity, a tubular movable core 41 arranged to move in the axial direction toward the inner circumference sides of the first and second stator cores 38 and 39, and a shaft 42 fixed to the inner circumference of the movable core 41. As the coil 37 is electrically conducted, a downward actuating force is applied to the shaft 42.

The solenoid valve body 31 is slidably inserted into the valve seat member 30. Specifically, the solenoid valve body 31 includes a small diameter portion 31a slidably inserted into the valve housing tube 30a of the valve seat member 30, a large diameter portion 31b provided oppositely to the valve seat member 30 upward of the small diameter portion 31a with a diameter larger than that of the small diameter portion 31a, an annular concave portion 31c provided between the small diameter portion 31a and the large diameter portion 31b, a flange-like spring shoe portion 31d provided in an outer circumference of an edge of the large diameter portion 31b opposite to the valve seat member 30, an accessing channel 31e penetrating between the lower end surface as one end of the solenoid valve body 31 and the upper end surface as the other end of the solenoid valve body 31, and an orifice 31f provided in the middle of the accessing channel 31e.

A sitting portion 31g is provided in the lower end of the large diameter portion 31b of the solenoid valve body 31 to face the control valve seat 30d. As the solenoid valve body 31 moves along the axial direction with respect to the valve seat member 30, the sitting portion 31g is seated on or unseated from the control valve seat 30d. The solenoid pressure control valve 6 includes the solenoid valve body 31 and the valve seat member 30. As the sitting portion 31g is seated on the control valve seat 30d, the solenoid pressure control valve 6 is closed.

A coil spring 34 that biases the solenoid valve body 31 to recede from the valve seat member 30 is interposed between the flange 30b of the valve seat member 30 and the spring shoe portion 31d. The solenoid Sol exerts an actuating force resisting to the biasing force of the coil spring 34 toward the solenoid valve body 31. That is, the solenoid valve body 31 is biased by the coil spring 34 to recede from the valve seat member 30 at all times. Therefore, if the actuating force resisting to the coil spring 34 is not applied from the solenoid Sol, the solenoid valve body 31 is held in a position farthest from the valve seat member 30. It is noted that a member for biasing the solenoid valve body 31 to recede from the valve seat member 30 is not limited to the coil spring 34. Instead, any elastic body may be employed if it can exert the biasing force.

When the solenoid valve body 31 recedes from the valve seat member 30 at the maximum, the solenoid valve body 31 has a shut-off position where the penetrating hole 30c is shut off while the small diameter portion 31a faces the penetrating hole 30c. Meanwhile, when the solenoid Sol is electrically conducted, and the solenoid valve body 31 moves at a certain distance toward the valve seat member 30, the solenoid valve body 31 has a control position where the penetrating hole 30c is opened while the concave portion 31c faces the penetrating hole 30c.

When the solenoid valve body 31 opens the penetrating hole 30c, and the sitting portion 31g is unseated from the control valve seat 30d, the penetrating hole 30c causes the expansion-side discharge passage Ee and the contraction-side discharge passage Ep to communicate with each other through the concave portion 31c of the solenoid valve body 31 and the chamfered trench 35a of the valve fixing member 35. If the force of lifting the solenoid valve body 31 is higher than the force of lowering the solenoid valve body 31, the solenoid pressure control valve 6 is opened. The force of lifting the solenoid valve body 31 is a resultant force between the biasing force of the coil spring 34 exerted to the solenoid valve body 31 and the pressure received by the solenoid valve body 31 in the upstream side. The force of lowering the solenoid valve body 31 is a resultant force between the actuating force of the solenoid Sol and the pressure received by the solenoid valve body 31 in the downstream side. The position of the solenoid valve body 31 with respect to the valve seat member 30 is controlled by adjusting the actuating force of the solenoid Sol. For this reason, the pressure in the upstream side of the solenoid pressure control valve 6 changes depending on the actuating force of the solenoid Sol. The upstream of the solenoid pressure control valve 6 communicates with the expansion-side back-pressure chamber Ce and the contraction-side back-pressure chamber Cp through the regulating passage Pc. For this reason, by controlling the solenoid pressure control valve 6, it is possible to control the pressures of the expansion-side back-pressure chamber Ce and the contraction-side back-pressure chamber Cp at the same time. In addition, the downstream of the solenoid pressure control valve 6 communicates with the expansion-side discharge passage Ee and the contraction-side discharge passage Ep. For this reason, the liquid passing through the solenoid pressure control valve 6 is discharged to contraction-side chamber R2 having a lower pressure during an expanding motion of the hydraulic shock absorber D and is discharged to the expansion-side chamber R1 having a lower pressure during a contracting motion of the hydraulic shock absorber D. The regulating passage Pc is formed by the annular trench 8e, the port 8f, the horizontal hole 8g, the port 32b, the chamfered trench 32c, a part of the housing portion L, the trench 32d, and the trench 8j.

In the event of a failure in which the solenoid Sol is not electrically conducted, the solenoid pressure control valve 6 has a shut-off position where the penetrating hole 30c is shut off by the small diameter portion 31a, so that it acts as an open/close valve as well as the pressure control valve. The failsafe valve FV opens or closes the annular concave portion 32a communicating with the port 32b. As the failsafe valve FV is opened, the port 32b communicates with the expansion-side discharge passage Ee and the contraction-side discharge passage Ep by detouring the solenoid pressure control valve 6. The valve open pressure of the failsafe valve FV is set to a pressure exceeding the maximum pressure controllable by the solenoid pressure control valve 6. When the pressure of the upstream side of the solenoid pressure control valve 6 exceeds the maximum controllable pressure, the failsafe valve FV is opened, and the pressures of the expansion-side back-pressure chamber Ce and the contraction-side back-pressure chamber Cp are controlled by the valve open pressure of the failsafe valve FV. Therefore, in the event of a failure, since the solenoid pressure control valve 6 has a shut-off position, the pressures of the expansion-side back-pressure chamber Ce and the contraction-side back-pressure chamber Cp are controlled by the failsafe valve FV.

While the solenoid valve body 31 is inserted into the valve housing tube 30a of the valve seat member 30, a space K is formed in a leading edge side from the penetrating hole 30c inside the valve housing tube 30a. The space K communicates with the outside of the solenoid valve body 31 through the orifice 31f and the accessing channel 31e provided in the solenoid valve body 31. When the solenoid valve body 31 moves along the axial direction, which is vertical with respect to the valve seat member 30, the space K serves as a dashpot. For this reason, it is possible to suppress abrupt displacement of the solenoid valve body 31 and a vibration motion of the solenoid valve body 31.

Next, a description will be made for operations of the hydraulic shock absorber D. As the hydraulic shock absorber D expands, and the piston 2 moves upward in FIG. 1, a liquid moves from the contracting expansion-side chamber R1 to the expanding contraction-side chamber R2 through the expansion-side passage 3 while the expansion-side valve body Ve is pressedly deformed. As described above, the expansion-side valve body Ve receives the expansion-side load caused by the pressure of the expansion-side back-pressure chamber Ce and is biased toward the piston 2 side. For this reason, the expansion-side valve body Ve is deformed to open the expansion-side passage 3 such that the load caused by the pressure of the expansion-side chamber R1 received from the expansion-side passage 3 side, a restoring force of the expansion-side valve body Ve for returning to the valve seat 2d side, which depends on the deformation amount, and the expansion-side load are balanced.

The liquid inside the expansion-side chamber R1 pressedly opens the expansion-side check valve Te and flows to the regulating passage Pc through the expansion-side pressure introduction passage Ie and the contraction-side pilot orifice Pp. If the penetrating hole 30c of the solenoid pressure control valve 6 is opened, the liquid flowing to the regulating passage Pc pressedly opens the check valve 25 and is discharged to the contraction-side chamber R2 having a lower pressure through the expansion-side discharge passage Ee. It is noted that the contraction-side pilot orifice Pp acts as resistance to the flow of the liquid and generates a pressure loss. For this reason, the pressure of the downstream of the regulating passage Pc is lower than the pressure of the expansion-side chamber R1. Therefore, the check valve 22 provided in the contraction-side discharge passage Ep is not opened and remains in the closed state.

The expansion-side pressure introduction passage Ie communicates with the expansion-side back-pressure chamber Ce through the communicating channel 24 as well as with the contraction-side back-pressure chamber Cp as described above. In addition, the contraction-side pressure introduction passage Ip communicating with the expansion-side back-pressure chamber Ce is closed by the contraction-side check valve Tp. For this reason, during an expanding motion of the hydraulic shock absorber D, it is possible to increase the pressure of the expansion-side back-pressure chamber Ce over the pressure of the contraction-side chamber R2. Here, the pressure of the contraction-side back-pressure chamber Cp also increases over the pressure of the contraction-side chamber R2. However, the pressure of the contraction-side back-pressure chamber Cp doesn't exert influence because it is applied only to the contraction-side valve body Vp that closes the contraction-side passage 4 where no liquid flow is generated.

Since the pressure of the upstream side of the regulating passage Pc is controlled by electrically conducting the solenoid Sol of the solenoid pressure control valve 6 provided in the regulating passage Pc, it is possible to control the expansion-side load to a desired value by adjusting the pressure of the expansion-side back-pressure chamber Ce. In this manner, it is possible to control the opening level of the expansion-side valve body Ve by using the solenoid pressure control valve 6. As a result, it is possible to control the expansion-side damping force for an expanding motion of the hydraulic shock absorber D.

Meanwhile, as the hydraulic shock absorber D contracts, and the piston 2 moves downward in FIG. 1, the liquid moves from the contracting contraction-side chamber R2 to the expanding expansion-side chamber R1 through the contraction-side passage 4 by pressedly deforming the contraction-side valve body Vp. As described above, the contraction-side valve body Vp receives the contraction-side load caused by the pressure of the contraction-side back-pressure chamber Cp and is biased to the piston 2 side. For this reason, the contraction-side valve body Vp is deformed to open the contraction-side passage 4 such that the load caused by the pressure of the contraction-side chamber R2 received from the contraction-side passage 4 side, a restoring force of the contraction-side valve body Vp for returning to the valve seat 2c side, which depends on the deformation amount, and the contraction-side load are balanced.

The liquid inside the contraction-side chamber R2 pressedly opens the contraction-side check valve Tp and flows to the regulating passage Pc through the contraction-side pressure introduction passage Ip and the expansion-side pilot orifice Pe. If the penetrating hole 30c of the solenoid pressure control valve 6 is opened, the liquid flowing to the regulating passage Pc pressedly opens the check valve 22 and is discharged to the expansion-side chamber R1 having a lower pressure through the contraction-side discharge passage Ep. It is noted that the expansion-side pilot orifice Pe acts as resistance to the liquid flow and generates a pressure loss. For this reason, the pressure of the downstream of the regulating passage Pc is lower than the pressure of the contraction-side chamber R2. Therefore, the check valve 25 provided in the expansion-side discharge passage Ee is not opened and remains in the closed state.

The contraction-side pressure introduction passage Ip communicates with the contraction-side back-pressure chamber Cp through the communicating channel 24 as well as with the expansion-side back-pressure chamber Ce as described above. In addition, the expansion-side pressure introduction passage Ie communicating with the contraction-side back-pressure chamber Cp is closed by the expansion-side check valve Te. For this reason, during a contracting motion of the hydraulic shock absorber D, it is possible to increase the pressure of the contraction-side back-pressure chamber Cp over the pressure of the expansion-side chamber R1. Here, the pressure of the expansion-side back-pressure chamber Ce also increases over the pressure of the expansion-side chamber R1. However, the pressure of the expansion-side back-pressure chamber Ce doesn't exert influence because it is applied only to the expansion-side valve body Ve that closes the expansion-side passage 3 where no liquid flow is generated.

Since the pressure of the upstream side of the regulating passage Pc is controlled by electrically conducting the solenoid Sol of the solenoid pressure control valve 6 provided in the regulating passage Pc, it is possible to control the contraction-side load to a desired value by adjusting the pressure of the contraction-side back-pressure chamber Cp. In this manner, it is possible to control the opening level of the contraction-side valve body Vp by using the solenoid pressure control valve 6. As a result, it is possible to control the contraction-side damping force for a contracting motion of the hydraulic shock absorber D.

According to the embodiment described above, it is possible to obtain the following functional effects.

In a vehicle shock absorber, it is necessary to increase the expansion-side damping force for the expanding motion over the contraction-side damping force for the contracting motion. In addition, in a single rod type hydraulic shock absorber D, the pressed area received from the pressure of the expansion-side chamber R1 is obtained by subtracting the cross-sectional area of the rod member 10 from the cross-sectional area of the piston 2. Therefore, it is necessary to increase the pressure of the expansion-side chamber R1 for an expanding motion over the pressure of the contraction-side chamber R2 for a contracting motion.

In this regard, in the hydraulic shock absorber D according to this embodiment, when the pressure of the expansion-side back-pressure chamber Ce is equal to the pressure of the contraction-side back-pressure chamber Cp, the expansion-side load applied to the expansion-side valve body Ve is set to be higher than the contraction-side load applied to the contraction-side valve body Vp. In addition, by using the expansion-side spool Se, it is possible to increase the pressed area of the expansion-side spool Se pressed by the pressure of the expansion-side back-pressure chamber Ce over the back face area of the expansion-side valve body Ve. As a result, compared to a case where the pressure of the expansion-side back-pressure chamber Ce is simply applied to the back face side of the expansion-side valve body Ve, it is possible to apply a higher expansion-side load to the expansion-side valve body Ve. Furthermore, since the expansion-side spool Se and the contraction-side spool Sp have different cross-sectional areas, it is possible to independently set the expansion-side load and the contraction-side load. In this manner, it is possible to improve freedom of design in the expansion-side load and the contraction-side load.

Therefore, in the hydraulic shock absorber D according to this embodiment, when the expansion-side damping force for an expanding motion is adjusted, it is possible to set the expansion-side spool Se to output a high expansion-side load even when the pressure of the expansion-side back-pressure chamber Ce is low. In this manner, since it is possible to suppress the control pressure, there is no need to provide a large-sized solenoid Sol. In addition, it is possible to widen a controllable range of the expansion-side damping force.

Since the expansion-side back-pressure chamber Ce and the contraction-side back-pressure chamber Cp communicate with each other, the pressure control for the expansion-side back-pressure chamber Ce and the contraction-side back-pressure chamber Cp is performed by using a single solenoid pressure control valve 6. In the hydraulic shock absorber D according to this embodiment, it is possible to set a high expansion-side load, compared to the contraction-side load. Therefore, even in the aforementioned configuration, it is possible to guarantee a controllable range of the expansion-side damping force. Furthermore, it is possible to configure the solenoid pressure control valve 6 with a single solenoid valve body 31 and simplify the structure of the valve body. Accordingly, it is possible to reduce cost.

In this manner, it is possible to miniaturize the solenoid Sol of the solenoid pressure control valve 6 and simplify the structure of the solenoid pressure control valve 6. For this reason, even when the solenoid pressure control valve 6 is employed in the piston of the hydraulic shock absorber D, the size of the hydraulic shock absorber D does not increase. As a result, it is possible to improve accessibility to a vehicle. Furthermore, the solenoid Sol does not necessarily exert a strong actuating force in order to increase the expansion-side damping force. For this reason, it is possible to reduce and save power consumption by reducing the damping force.

Just by setting the pressed area of the expansion-side spool Se pressed by the pressure of the expansion-side back-pressure chamber Ce to be larger than the pressed area of the contraction-side spool Sp pressed by the pressure of the contraction-side back-pressure chamber Cp, it is possible to increase the expansion-side load compared to the contraction-side load.

The expansion-side back-pressure chamber Ce and the contraction-side back-pressure chamber Cp communicate with each other through the communicating channel 24, the expansion-side resistance element, and the contraction-side resistance element. The contraction-side pressure introduction passage Ip introduces the liquid from the contraction-side chamber R2 to the expansion-side back-pressure chamber Ce with little resistance. For this reason, when the hydraulic shock absorber D switches from an expanding motion to a contracting motion, the pressure of the contraction-side chamber R2 is rapidly introduced into the expansion-side back-pressure chamber Ce. As a result, the expansion-side spool Se presses the expansion-side valve body Ve by virtue of the pressure of the expansion-side back-pressure chamber Ce and the biasing force of the spring member 16, so that the expansion-side valve body Ve can be rapidly seated on the valve seat 2d to close the expansion-side passage 3. Similar to the contraction-side pressure introduction passage Ip, the expansion-side pressure introduction passage Ie introduces the liquid from the expansion-side chamber R1 to the contraction-side back-pressure chamber Cp with little resistance. For this reason, when the hydraulic shock absorber D switches from a contracting motion to an expanding motion, the pressure of the expansion-side chamber R1 is rapidly introduced into the contraction-side back-pressure chamber Cp. As a result, the contraction-side spool Sp presses the contraction-side valve body Vp by virtue of the pressure of the contraction-side back-pressure chamber Cp and the biasing force of the spring member 20, so that the contraction-side valve body Vp can be rapidly seated on the valve seat 2c to close the contraction-side passage 4. In this manner, in the hydraulic shock absorber D according to this embodiment, even when the contraction or expansion speed is fast, and the switching between the expanding and contracting motions is performed instantly, there is no delay in the closing operation for the expansion-side valve body Ve and the contraction-side valve body Vp. For this reason, it is possible to exert a damping force as desired from the start of the expansion/contraction direction switching.

The expansion-side pressure introduction passage Ie and the contraction-side pressure introduction passage Ip are not provided with the expansion-side resistance element and the contraction-side resistance element. For this reason, even when a gap is formed between the contraction-side housing 11 and the expansion-side housing 12 due to aging of the annular disk 19 of the expansion-side check valve Te and the annular disk 15 of the contraction-side check valve Tp, there is no change in a flow rate passing through the expansion-side pressure introduction passage Ie and the contraction-side pressure introduction passage Ip. Therefore, there is no influence on the valve close operations of the check valves Te and Tp during the damping force control and the expansion/contraction switching.

The piston 2 having the expansion-side passage 3 and the contraction-side passage 4, the expansion-side valve body Ve and the contraction-side valve body Vp stacked on the piston 2, the expansion-side housing 12 that receives the expansion-side spool Se slidably inserted to form the expansion-side back-pressure chamber Ce, and the contraction-side housing 11 that receives the contraction-side spool Sp slidably inserted to form the contraction-side back-pressure chamber Cp are mounted to the outer circumference side of the piston rod 7. In addition, the expansion-side housing 12 is provided with the contraction-side pressure introduction passage Ip, and the contraction-side housing 11 is provided with the expansion-side pressure introduction passage Ie. In this manner, each member necessary to adjust the damping force can be arranged concentratedly in the surroundings of the piston 2 of the hydraulic shock absorber D.

The biasing for the expansion-side spool Se abutting on the expansion-side valve body Ve and the biasing for the annular disk 15 for opening or closing the contraction-side pressure introduction passage Ip are performed by using a single spring member 16. In addition, the biasing for the contraction-side spool Sp abutting on the contraction-side valve body Vp and the biasing for the annular disk 19 for opening or closing the expansion-side pressure introduction passage Ie are performed by using a single spring member 20. In this manner, by using a single spring member 16 or 20, it is possible to apply the biasing force toward the check valves Te and Tp and the spools Se and Sp. Therefore, it is possible to reduce the number of components.

The piston rod 7 of the hydraulic shock absorber D includes the holding shaft 8a that is provided in a leading edge and has an outer circumference where the piston 2, the expansion-side valve body Ve, the contraction-side valve body Vp, the expansion-side housing 12, and the contraction-side housing 11 are mounted, the vertical hole 8d opened in the leading edge of the holding shaft 8a, the expansion-side pilot orifice Pe and the contraction-side pilot orifice Pp that are provided in the holding shaft 8a and communicate with the communicating channel 24 provided in the vertical hole 8d, the housing portion L provided inside the piston rod 7 to house the solenoid pressure control valve 6, the regulating passage Pc that causes the communicating channel 24 and the housing portion L to communicate with each other, the contraction-side discharge passage Ep that causes the housing portion L and the expansion-side chamber R1 to communicate with each other, and the separator 23 that is inserted into the vertical hole 8d to form the communicating channel 24 that causes the expansion-side back-pressure chamber Ce and the contraction-side back-pressure chamber Cp to communicate with each other inside the vertical hole 8*d* by the annular trench 23*a* provided in the outer circumference and form the expansion-side discharge passage Ee in the inner circumference. In this manner, it is possible to house the solenoid pressure control valve 6 inside the piston rod 7 and arrange the expansion-side back-pressure chamber Ce and the contraction-side back-pressure chamber Cp in the outer circumference of the piston rod 7 by deviating the solenoid pressure control valve 6 from the axial direction. For this reason, it is possible to reduce the size of the hydraulic shock absorber D in the radial direction.

The piston rod 7 of the hydraulic shock absorber D further has the failsafe valve FV provided in the middle of the regulating passage Pc to detour the solenoid pressure control valve 6. The solenoid pressure control valve 6 is set to shut off the regulating passage Pc when it is not electrically conducted or perform a pressure control when it is electrically conducted. In addition, the valve open pressure of the failsafe valve FV is set to be higher than the maximum controllable pressure of the solenoid pressure control valve 6. In this manner, since the valve open pressure of the failsafe valve FV is higher than the maximum controllable pressure of the solenoid pressure control valve 6, the expansion-side load and the contraction-side load are maximized in the event of a failure, so that the hydraulic shock absorber D exerts a maximum damping force. For this reason, even in the event of a failure, it is possible to stabilize a vehicle posture.

When the solenoid pressure control valve 6 is placed in the shut-off position, the small diameter portion 31*a* of the solenoid valve body 31 faces the penetrating hole 30*c* and closes the penetrating hole 30*c*. Instead of this configuration, the penetrating hole 30*c* may not be perfectly closed by slightly deviating the concave portion 31*c* of the solenoid valve body 31 from the penetrating hole 30*c* even when the solenoid pressure control valve 6 is placed in the shut-off position. As a result, the solenoid pressure control valve 6 can serve as a throttle valve. In this case, to a damping characteristic of the hydraulic shock absorber D in the event of a failure, it is possible to add a characteristic of the throttle valve, that is, a slowly changing damping force characteristic, in particular, when the piston speed is slow. For this reason, it is possible to improve a vehicle ride quality even in the event of a failure.

The solenoid pressure control valve 6 has the valve seat member 30 and the solenoid valve body 31 inserted into the valve seat member 30 to slide along the axial direction. The valve seat member 30 has the valve housing tube 30*a* provided with the penetrating hole 30*c* that causes the inside and the outside to communicate with each other and the annular control valve seat 30*d* provided in the edge of the valve housing tube 30*a*. The solenoid valve body 31 has the small diameter portion 31*a* slidably inserted into the valve housing tube 30*a*, the large diameter portion 31*b* having an outer diameter larger than that of the small diameter portion 31*a*, the concave portion 31*c* provided between the small diameter portion 31*a* and the large diameter portion 31*b* to face the penetrating hole 30*c*, and the sitting portion 31*g* provided in the lower end of the large diameter portion 31*b* to face the control valve seat 30*d*. The solenoid pressure control valve 6 shuts off the regulating passage Pc as the small diameter portion 31*a* faces the penetrating hole 30*c*. In the aforementioned configuration, the pressed area caused by the pressure of the upstream side for causing the solenoid valve body 31 to escape from the valve seat member 30 corresponds to an area obtained by subtracting an area of a circle formed by setting the outer diameter of the concave portion 31*c* as a diameter from an area of a circle formed by setting the inner diameter of the control valve seat 30*d* as a diameter. In this manner, it is possible to increase the flow passage area when the valve is opened. Therefore, it is possible to stabilize the operation of the solenoid valve body 31. Furthermore, in the shut-off position in which the outer circumference of the small diameter portion 31*a* faces the penetrating hole 30*c* and closes the penetrating hole 30*c*, the solenoid pressure control valve 6 remains in the closed position even when a pressure is applied from the upstream side. For this reason, it is possible to activate only the failsafe valve FV.

Embodiments of the present invention were described above, but the above embodiments are merely examples of applications of the present invention, and the technical scope of the present invention is not limited to the specific constitutions of the above embodiments.

This application claims priority based on Japanese Patent Application No. 2013-207870 filed with the Japan Patent Office on Oct. 3, 2013, the entire contents of which are incorporated into this specification.

The invention claimed is:

1. A hydraulic shock absorber comprising:
   a cylinder;
   a piston slidably inserted into the cylinder to partition the inside of the cylinder into an expansion-side chamber and a contraction-side chamber;
   an expansion-side passage and a contraction-side passage that connect the expansion-side chamber with the contraction-side chamber;
   an expansion-side valve body configured to open or close the expansion-side passage;
   a contraction-side valve body configured to open or close the contraction-side passage;
   an expansion-side back-pressure chamber configured to press an expansion-side spool abutting on the expansion-side valve body by virtue of an internal pressure, the expansion-side back-pressure chamber being configured to bias the expansion-side valve body to close the expansion-side passage;
   a contraction-side back-pressure chamber configured to press a contraction-side spool abutting on the contraction-side valve body by virtue of an internal pressure, the contraction-side back-pressure chamber being configured to bias the contraction-side valve body to close the contraction-side passage;
   a communicating channel that communicates with the expansion-side back-pressure chamber through an expansion-side resistance element configured to generate resistance to a passing liquid flow, the communicating channel communicating with the contraction-side back-pressure chamber through a contraction-side resistance element configured to generate resistance to a passing liquid flow;
   an expansion-side pressure introduction passage configured to permit only a liquid flow directed from the expansion-side chamber to the contraction-side back-pressure chamber;
   a contraction-side pressure introduction passage configured to permit only a liquid flow directed from the contraction-side chamber to the expansion-side back-pressure chamber;
   a regulating passage connected to the communicating channel;

a contraction-side discharge passage that connects the downstream of the regulating passage with the expansion-side chamber, the contraction-side discharge passage being configured to permit only a liquid flow directed from the regulating passage to the expansion-side chamber;

an expansion-side discharge passage that connects the downstream of the regulating passage with the contraction-side chamber, the expansion-side discharge passage being configured to permit only a liquid flow directed from the regulating passage to the contraction-side chamber; and a solenoid pressure control valve provided in the regulating passage to control a pressure in the upstream of the regulating passage, wherein the expansion-side pressure introduction passage communicates the expansion-side chamber with the contraction-side back-pressure chamber without passing through the contraction-side resistance element, the contraction-side pressure introduction passage communicates the contraction-side chamber with the expansion-side back-pressure chamber without passing through the expansion-side resistance element, and when a pressure of the expansion-side back-pressure chamber is equal to a pressure of the contraction-side back-pressure chamber, an expansion-side load for biasing the expansion-side valve body by virtue of the pressure of the expansion-side back-pressure chamber is larger than a contraction-side load for biasing the contraction-side valve body by virtue of the pressure of the contraction-side back-pressure chamber.

2. The hydraulic shock absorber according to claim 1, wherein a pressed area of the expansion-side spool pressed by the pressure of the expansion-side back-pressure chamber is larger than a pressed area of the contraction-side spool pressed by the pressure of the contraction-side back-pressure chamber.

3. The hydraulic shock absorber according to claim 1, further comprising:
   a piston rod inserted into the cylinder, the piston rod having an outer circumference where the piston, the expansion-side valve body, and the contraction-side valve body are mounted;
   a tubular expansion-side housing mounted to the outer circumference side of the piston rod, the expansion-side housing having an inner circumference where the expansion-side spool is slidably inserted to form the expansion-side back-pressure chamber; and
   a tubular contraction-side housing mounted to the outer circumference side of the piston rod, the contraction-side housing having an inner circumference where the contraction-side spool is slidably inserted to form the contraction-side back-pressure chamber,
   wherein the piston is an annular member provided with the expansion-side passage and the contraction-side passage,
   the expansion-side valve body and the contraction-side valve body are annular members,
   the contraction-side pressure introduction passage is provided in the expansion-side housing, and
   the expansion-side pressure introduction passage is provided in the contraction-side housing.

4. The hydraulic shock absorber according to claim 3, further comprising:
   a first spring member configured to bias the expansion-side spool toward the expansion-side valve body, the first spring member being configured to bias a valve body of a contraction-side check valve configured to open or close the contraction-side pressure introduction passage; and
   a second spring member configured to bias the contraction-side spool toward the contraction-side valve body, the second spring member being configured to bias a valve body of an expansion-side check valve configured to open or close the expansion-side pressure introduction passage.

5. The hydraulic shock absorber according to claim 3, wherein the piston rod has
   a holding shaft provided in a leading edge of the piston rod, the holding shaft having an outer circumference where the piston, the expansion-side valve body, the contraction-side valve body, the expansion-side housing, and the contraction-side housing are mounted,
   a vertical hole opened on a leading edge of the holding shaft,
   the expansion-side resistance element and the contraction-side resistance element that are provided in the holding shaft and communicate with the communicating channel provided in the vertical hole,
   a housing portion provided inside the piston rod to house the solenoid pressure control valve, the housing portion communicating with the communicating channel through the regulating passage,
   the contraction-side discharge passage that connects the housing portion with the expansion-side chamber, and
   a tubular separator inserted into the vertical hole to form the communicating channel inside the vertical hole in conjunction with an annular trench provided in an outer circumference, the tubular separator having an inner circumference where the expansion-side discharge passage is formed.

6. The hydraulic shock absorber according to claim 1, further comprising a failsafe valve configured to detour the solenoid pressure control valve,
   wherein the solenoid pressure control valve shuts off the regulating passage when it is not electrically conducted,
   the solenoid pressure control valve performs a pressure control when it is electrically conducted, and
   a valve open pressure of the failsafe valve is set to be larger than a maximum controllable pressure of the solenoid pressure control valve.

\* \* \* \* \*